(12) United States Patent
Ouriev

(10) Patent No.: US 7,661,941 B2
(45) Date of Patent: Feb. 16, 2010

(54) MACHINE WITH VIBRATABLE SECTION

(75) Inventor: Boris Ouriev, Niederuzwil (CH)

(73) Assignee: Buehler AG, Uzwil (CH)

( * ) Notice: Subject to any disclaimer, the term of this patent is extended or adjusted under 35 U.S.C. 154(b) by 905 days.

(21) Appl. No.: 10/501,605

(22) PCT Filed: Dec. 9, 2002

(86) PCT No.: PCT/CH02/00678

§ 371 (c)(1),
(2), (4) Date: Dec. 14, 2004

(87) PCT Pub. No.: WO03/057449

PCT Pub. Date: Jul. 17, 2003

(65) Prior Publication Data

US 2007/0041794 A1    Feb. 22, 2007

(30) Foreign Application Priority Data

Jan. 14, 2002   (DE) ................. 102 01 215
Jan. 21, 2002   (DE) ................. 102 02 238

(51) Int. Cl.
*B29C 39/24* (2006.01)
*B29C 47/36* (2006.01)
*B29C 47/68* (2006.01)

(52) U.S. Cl. .................. 425/3; 425/169; 425/199; 425/204; 425/206; 425/211; 425/376.1; 425/382.4; 425/456; 425/461

(58) Field of Classification Search .............. 425/3, 425/169, 170, 197, 198, 199, 204, 206, 211, 425/376.1, 382.4, 456, 461
See application file for complete search history.

(56) References Cited

U.S. PATENT DOCUMENTS

| 2,101,031 | A | * | 12/1937 | Little | 404/102 |
| 2,765,153 | A | * | 10/1956 | Gielow et al. | 366/79 |
| 3,400,428 | A | * | 9/1968 | Barainsky | 425/209 |
| 3,529,188 | A | * | 9/1970 | Gearing | 310/27 |
| 3,619,429 | A | * | 11/1971 | Torigai et al. | 264/433 |
| 3,733,059 | A | * | 5/1973 | Pettit | 366/79 |
| 7,569,173 | B2 | * | 8/2009 | Soulier | 264/464 |

FOREIGN PATENT DOCUMENTS

| EP | 0 612 603 | 8/1994 |
| GB | 1 171 735 | 11/1969 |
| SU | 856 833 | 8/1981 |
| SU | 1 445 676 | 12/1988 |

* cited by examiner

*Primary Examiner*—Robert B Davis
*Assistant Examiner*—Joseph Leyson
(74) *Attorney, Agent, or Firm*—Jordan and Hambury LLP

(57) ABSTRACT

A machine for treating or processing a conveyable material, particularly a free-flowing or pasty material or a bulk material comprises at least one passage section having at least one passage through which the conveyable material, which is to be treated or processed, can be conveyed along a direction of conveyance. The at least one passage section forms at least one partial area of a channel of the machine and is mounted so that it can move in relation to this channel. This at least one passage section is coupled to at least one source, which is provided for effecting oscillations and by means of which the passage section can be set in mechanical oscillatory motion with regard to the channel of the machine.

34 Claims, 4 Drawing Sheets

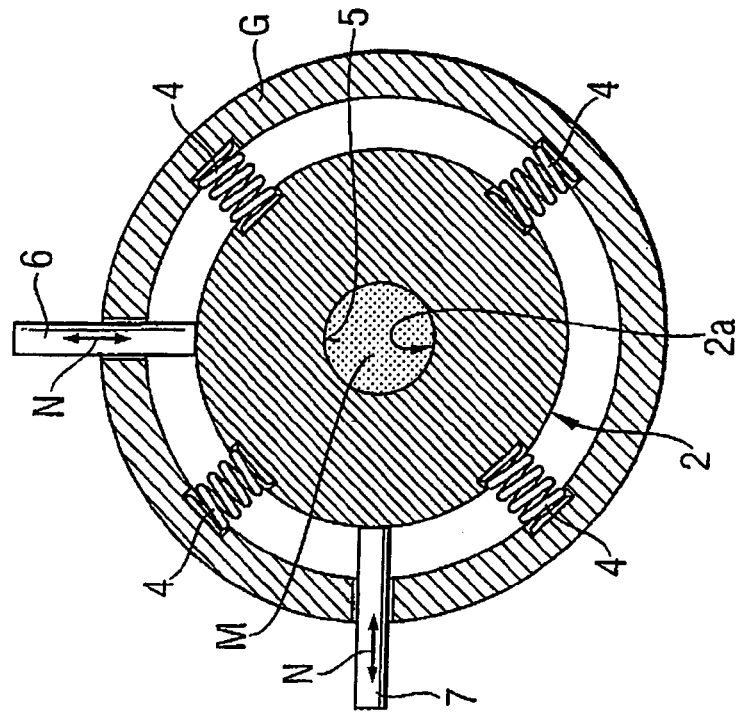
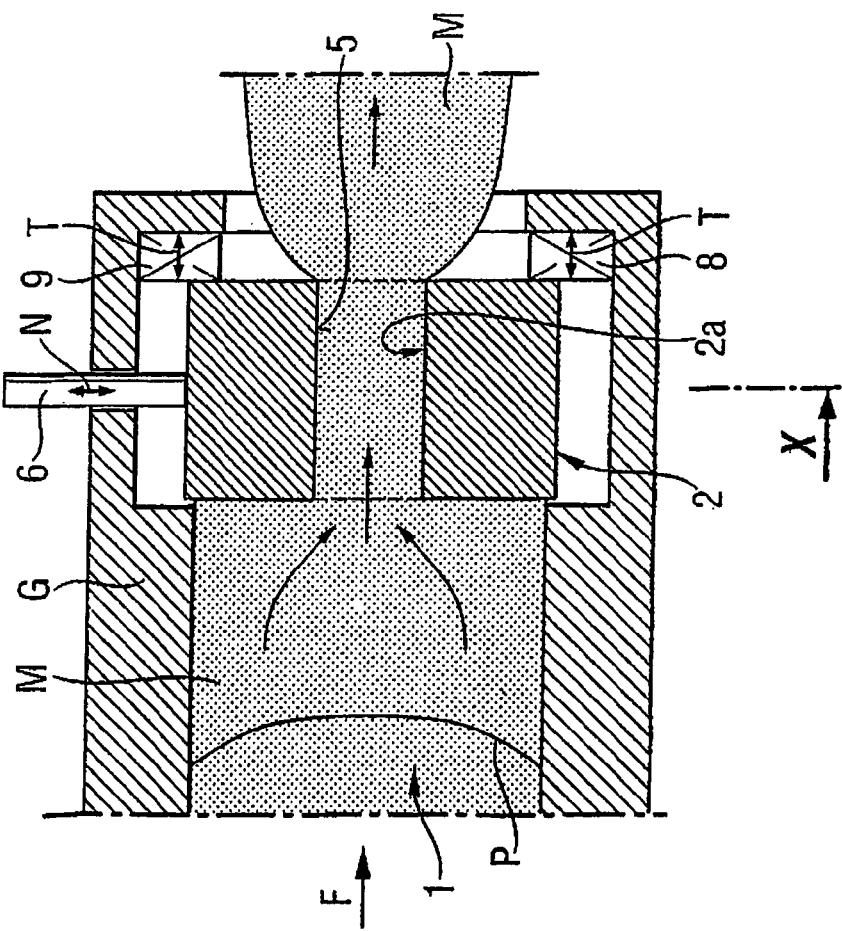

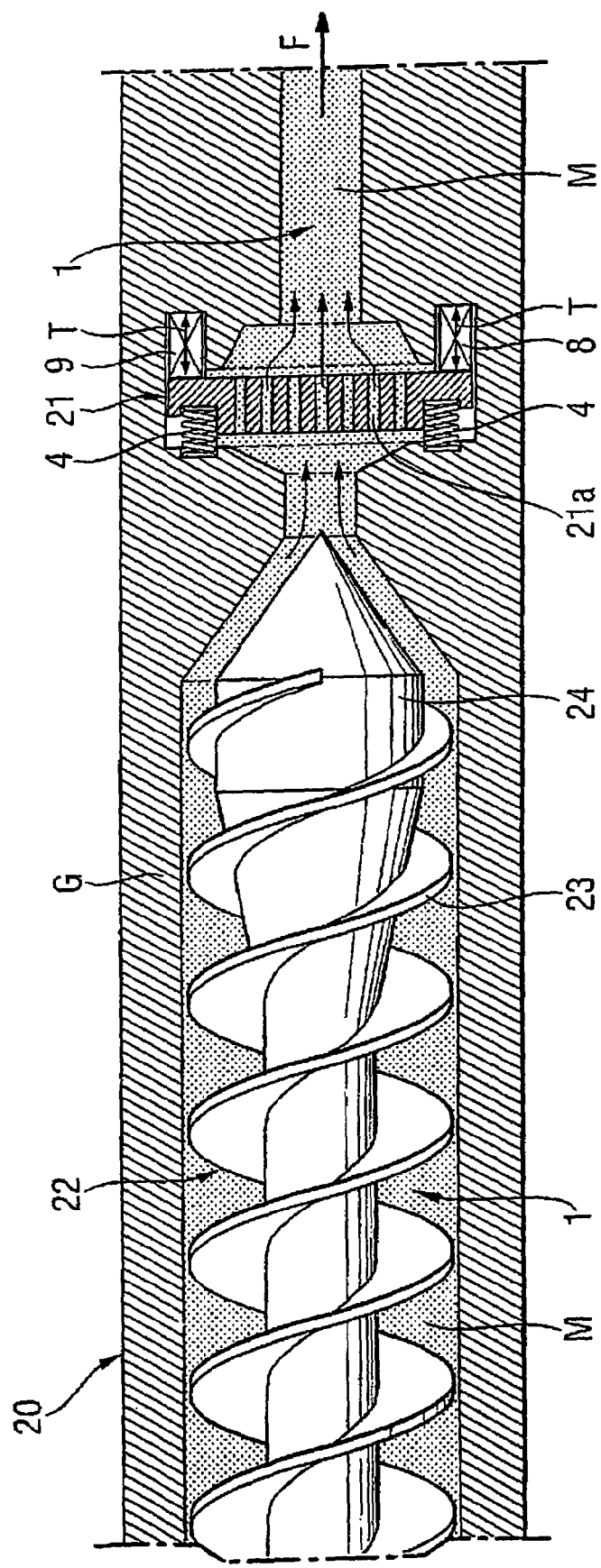

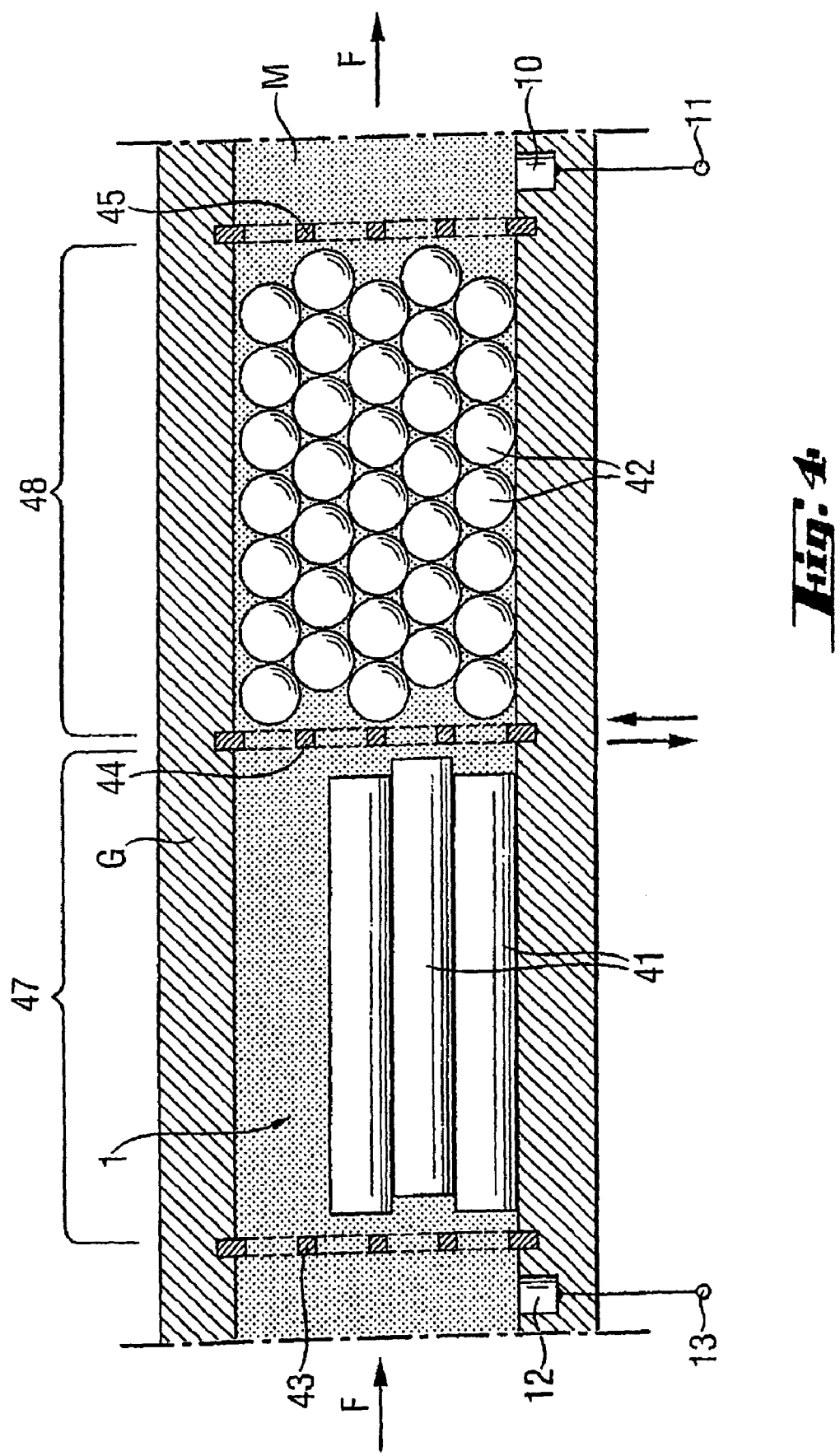

MACHINE WITH VIBRATABLE SECTION

BACKGROUND OF THE INVENTION

This invention relates to a machine for machining or processing a conveyable material, in particular a pourable or pasty mass or a loose material, wherein the machine has at least one outlet section with at least one outlet, through which the conveyable material to be machined or processed can be transported along a conveying direction.

The material is transported and machined or processed in such machines. In viscous or pasty materials, e.g., chocolate, dough or thermoplastics/elastomers, transport takes place via an extruder, for example. Depending on the material, machining or processing takes place in mixers, rolls, mills or extruders. In this case, the material is subjected to shearing and/or expansion, thereby becoming thoroughly mixed. In the case of emulsions (e.g., chocolate) or suspensions (wet milling), the emulsified or suspended particles are comminuted. Most often, the objective is to more or less lastingly changing the rheological properties of the material by altering the size distribution of emulsified or suspended particles, the degree to which structures are cross-linked or the average length of molecules. Such changes are produced through exposure to mechanical, thermal, chemical or enzymatic factors.

A lot of energy and in part correspondingly large machines are required for the transport and machining/processing of viscous or pasty masses, but also for the transport of loose material.

EP 0 612 603 describes a system and a method for facilitating the flow of an elastomeric materials through a nozzle. For this purpose, a nozzle of an extruder and, accordingly, a passage formed in the nozzle, are vibrated by means of ultrasound, as a result of which the friction between the material and the passage is decreased. The vibration is produced by means of an electric circuit, which applies an electric vibrational signal to a piezoelectric converter. This signal can then be transformed into mechanical vibrations, which are transferred to the passage.

SU 856 833 A1 and SU 1 445 676 A1 disclose a similar system. Here also, one or more vibration emitters are provided, which are mounted at the inner wall of an extruder housing also in the discharge region of the extruder.

GB 1,171,735 A1 describes a spin packing, which is disposed upstream from a nozzle plate, with which polymers are spun into filaments. For this purpose, the polymer melt must be pumped through the holes of the nozzle plate. Balls are contained in the spin packing and form a ball bed, which ensures equalization of the melt flow over the whole of the nozzle plate, so that the residence time of the polymer melt in the whole of the spinning head is as uniform as possible over the surface of the nozzle plate and, above all, so that dead regions between the nozzle holes, which are relatively far apart in comparison to their diameter, are avoided.

For all of these known solutions of the state of the art, vibrations for affecting the rheological properties of the fluid are induced only over the surface of a vibrating nozzle or of a different vibrating region in the interior of a housing in a viscous or viscoelastic fluid (suspension, emulsion, melt of a thermoplastic material, elastomer).

GB 1,171,735 A admittedly mentions two balls in a spin packing. However, these balls form a "ball bed" in the spin packing, which, instead of vibrating, only brings about an equalization of the residence time of the fluid flowing through the ball bed. Every effort is made not to interfere in any way and, especially, and not by vibrations, with the very unstable spinning process.

SUMMARY OF THE INVENTION

Therefore, the object of the invention is to effect a savings relative to energy and/or machine size during the machining/processing and primarily the transport of viscous or viscoelastic, pasty materials in the machine.

In another advantageous embodiment of the machine according to the invention, the at least one outlet section in the channel of the machine is a volumetric section of the channel filled with vibratable collision elements. It forms a collision element package in which the collision elements are more or less densely packed. The oscillation source coupled with the collision element package impacts the collision elements in the package via the wall of the package, and imparts vibration to the collision elements. The material transported between the collision elements in the outlet section is essentially machined in two ways by the movement of the collision elements. On the one hand, impacts between the collision elements trigger a dispersion or deagglomeration of emulsified or suspended particles of the material, which at that time are between the collision elements impacting each other. On the other hand, (non-impacting) relative movements of adjacent collision elements produce a shearing gradient, and hence a shearing and/or expansion of the material, which reduced its viscosity.

The collision elements best form as dense a package as possible, with hollow spaces between contacting collision elements, wherein the collision elements in particular vary in size and/or shape. In this embodiment, numerous collision elements are in the package on the one hand, which yields a high number of impacts. On the other hand, the average distances between adjacent collision elements are small, so that a high shearing gradient and expansion gradient is present at a specific impact strength.

The collision elements can have at least one of the following shapes, as needed: spherical, polyhedral, bar-shaped, in particular cylindrical or prismatic. In the case of a sphere, very high, point-acting impact strengths are achieved, which can also break highly stable agglomerates, but have a relatively low probability of hitting an agglomerate. The polyhedral shape enables relatively weak, superficial or angular impact strengths, but the probability of hitting an agglomerate is much higher than for spheres. In addition, the expected shearing effect is higher than for spheres. The rod-shaped collision elements allow the introduction of vibrations preferentially directed toward the collision element package. For example, the rods can be arranged parallel to each other in the package, and impacts can be initiated in such a way that the rods move primarily to and fro along the direction of the rod. This causes the shearing effect to dominate between the rods relative to the impact action between the rods. The prismatic shape is preferred given a vertical arrangement of the outlet section, also with vertically arranged rods, while the cylindrical shape is preferred given a horizontal arrangement of the outlet section.

At least one part of the collision elements preferably consists of an electrically conductive material, and the source for oscillations is a source for electromagnetic oscillations, wherein the electrically conductive collision elements can be excited by the generated electromagnetic alternating fields to mechanical oscillations and/or movements. This embodiment enables a particularly elegant, non-contact inductive coupling of the oscillation source to the collision elements.

This object is achieved according to the invention by virtue of the fact that, in the machine mentioned at the outset, the at least one outlet section ("vibro-channel", "vibro-action") forms at least one partial area of a channel of the machine, and is moveably mounted relative to the channel of the machine, wherein the at least one outlet section is coupled with at least one source for oscillations, by means of which it can be made to mechanically oscillate relative to the channel of the machine.

In addition to the cited mechanical, thermal, chemical and enzymatic effects on the material, which primarily result in permanent changes in the material, the machine according to the invention now also makes it possible to influence the material during its transport through the outlet section, which takes up at least a partial area of the machine. The outlet section of the machine made to mechanically oscillate also makes the material transported through the outlet oscillate, which alters its rheological properties, at least for the duration of the mechanical oscillations.

For example, vibrating the material that is transported through the machine and to be processed makes it possible to reduce its effective ("apparent") viscosity during the vibration, enabling a savings in the required conveying or pumping capacity. On the other hand, vibrating the material can also help to deagglomerate particles emulsified or suspended in the material. This effect takes place at least during vibration, and can sometimes persist even after vibration.

Resilient means are preferably used to mount the at least one outlet section relative to the channel of the machine. This makes it possible to vibrate the entire outlet section relative to the remaining channel of the machine. If only a fraction of the mass of the remaining rigidly interconnected machine parts is selected for the mass of the vibratable outlet section, the oscillation amplitude of the vibrating outlet section is a corresponding multiple greater than the oscillation amplitude of the entire machine, including casing.

To minimize any "resonation" by the remaining machine components during the vibration of the outlet section, dampening means can also be arranged between the at least one outlet section and the channel of the machine, wherein in particular the fluid can have a dampening effect as well.

In a particularly advantageous embodiment, the at least one outlet section and the channel of the machine are decoupled in terms of oscillation. To this end, for example, the outlet section is divided into at least two halves of the same mass slide-mounted to the remainder of the machine, between which a respective source of mechanical oscillations is arranged and rigidly connected with the respective half of the outlet section. As a result, the two halves can oscillate in opposition of phase, neutralizing all forces conveyed by the vibrating parts of the outlet section to the remainder of the machine.

The at least one source can preferably impart to the at least one outlet section oscillations of a kind that exhibit a tangential and/or normal component relative to the surface of the at least one outlet facing the conveyable material. The tangential component makes it possible to diminish friction at the contact surface between the outlet and the transported material, which yields an energy savings on the one hand, and a standardization of the retention time for the material in the outlet section on the other (parabolic profile becomes a cork-shaped profile). The normal component can emit longitudinal waves into the material, and is particularly suited for influencing the volumetric properties of the material.

Several outlet sections can also be sequentially arranged in at least one partial area of the channel of the machine along the conveying direction of the channel, wherein at least some of the several sequential outlet sections can be spaced apart along the conveying direction, if needed. This enables a multi-stage vibration treatment of the material as it passes through the machine using other machining/processing steps, if needed, such as steps for adding or removing material components, energy, etc. (metering, degassing, heating, cooling).

As already mentioned further above, the several outlet sections can be identical to each other. This is advantageous when an oscillation is generated in opposition of phase, since practically no vibration is then imparted to the machine frame.

If needed, at least some of the several outlet sections can also be different from each other. This then makes it possible to vary the vibration treatment of the material in the respective outlet sections.

The several outlet sections can be made to oscillate identically to each other or differently from each other, wherein the at least one source for mechanical oscillations is a vibrator, for example, which generates damped, forced oscillations of the at least one outlet section. The forced oscillations can here involve to-and-fro movements of the one or several outlet sections and/or oscillations distributed over the entire volume of an outlet section. In addition, vibrations can take place at a single or a few specific frequencies, preferably each with high amplitude, e.g., to achieve material-specific effects in the material to be treated. On the other hand, excitation can also take place over a wide frequency range. For this purpose, the at least one source for mechanical oscillations is a striker that generates dampened collision excitations of the at least one outlet section.

The machine according to the invention can also be outfitted at several locations with sources for mechanical oscillations. This makes it possible to expose the material transported through the machine to very specific, three-dimensional, if needed, location-variable vibration interference patterns or standing waves, which in turn can be advantageous or absolutely necessary for specifically influencing the rheological properties. For example, the equiphase overlapping of oscillations that can originate from several sources at a single location in the material to be machined makes it possible to generate an oscillation amplitude high enough to achieve a deagglomeration of particles at this location. In this connection, it is particularly advantageous to excite the particles with their resonance frequency.

It is best that the at least one source for mechanical oscillations be activatable independently of the operating status of the machine, wherein several sources for mechanical oscillations can preferably be activated separately from each other. By changing the relative phases of the oscillations of the several sources, the locations of particularly intensive vibration, i.e., the three-dimensional interference pattern with its "focal points, focal lines and focal planes" of high amplitude, can then be moved, thereby penetrating the entire volume of the material and subjecting it to vibration machining.

It is particularly advantageous if at least a first device for acquiring the rheological properties of the conveyable material is arranged downstream from the respective outlet section in the machine according to the invention in order to generate first signals at a first signal output that characterize the physicochemical, in particular rheological properties of the material downstream from the outlet section. At least one second device for acquiring the rheological properties of the conveyable material is also preferably arranged upstream from the respective outlet section for generating second signals at a second signal output that characterize the physicochemical, in particular rheological properties of the material upstream from the outlet section. This makes it possible to compare the rheology signals of the first and/or second signal output with those rheology reference signals that characterize specific rheological properties, and/or to compare the rheology signals of the first and second signal output with each other, wherein feedback takes place within a control circuit as a function of the result from comparing the signals to activate the at least one source for mechanical oscillations. As a result, the rheological properties (flow and material characteristics) of the material can be continuously monitored or held constant during its machining/processing.

In a special embodiment, the channel of the machine and the at least one outlet of the outlet section run vertically or horizontally.

The machine can be an extruder, for example, and the at least one outlet section can be a die, in particular an extrusion die, of the extruder. The vibrating die then also helps influence the rheological properties of the material and reduction in the die resistance.

The machine can also be an extruder, and the at least one outlet section can be a melt filter of the extruder. The melt filter then vibrates so that it does not become clogged.

In another special case, the machine is diecasting machine, and the at least one outlet section is a conditioning cell of the diecasting machine. Vibrating the conditioning cell makes it possible to influence point crystallization inside the melt to be cast (concentration and/or size distribution of the crystal nuclei and/nor crystallites).

Additional advantages, features and possible applications of the invention will now be presented in the following description of exemplary embodiments of the invention, which are not to be construed as limiting, based upon the drawing drawings.

BRIEF DESCRIPTION OF THE DRAWINGS

FIG. 1A is the basic structure of a partial area of the machine according to the invention of relevance in terms of the invention in longitudinal section based on a first exemplary embodiment, diagrammatic view;

FIG. 1B is the basic structure of the partial area shown on FIG. 1A in transverse section along the X-X plane, diagrammatic view;

FIG. 2 is a second exemplary embodiment of a partial area of the machine according to the invention of relevance in terms of the invention, diagrammatic view;

FIG. 4 is a fourth exemplary embodiment of a partial area of the machine according to the invention of relevance in terms of the invention, diagrammatic view;

DESCRIPTION OF THE PREFERRED EMBODIMENTS

Figure 3:
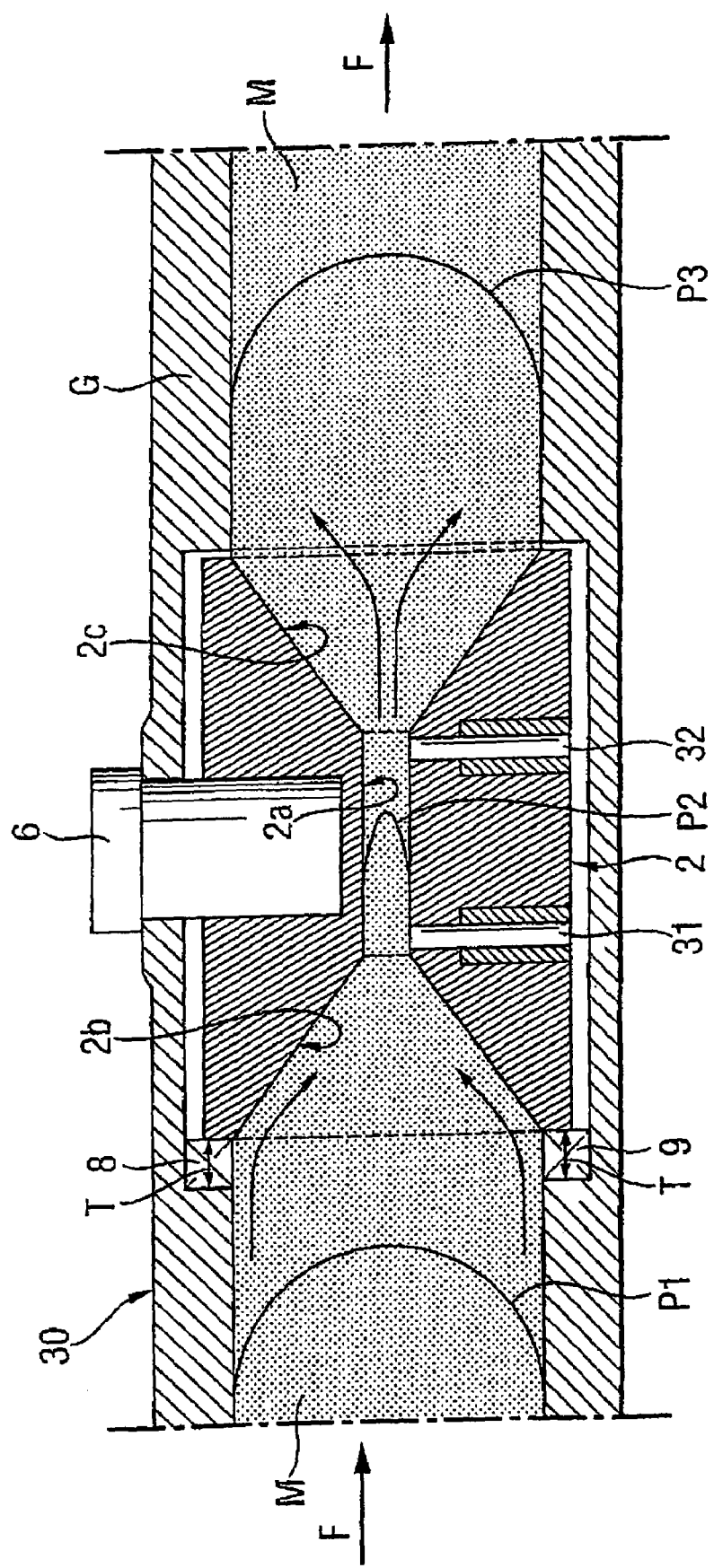
FIG. 3 is a third exemplary embodiment of a partial area of the machine according to the invention of relevance in terms of the invention, diagrammatic view.

Using a first exemplary embodiment, FIG. 1A provides a diagrammatic view of the basic structure of the machine according to the invention in longitudinal section for a partial area of the machine of relevance in terms of the invention. The machine has a casing G, into which a channel 1 extends. A partial area of the channel 1 is formed by an outlet section 2 having a central outlet 2a. In this exemplary embodiment, this outlet section 2 is the die of an extruder or a diecasting machine. The transported material M to be machined or processed moves through the machine along conveying direction F. The outlet section or die 2 is mounted relative to the casing G so that it can move both in the radial direction, i.e., perpendicular to the conveying direction F, and in the axial direction, i.e., parallel to the conveying direction F. In addition, a total of four sources 6, 7, 8, 9 are provided for mechanical oscillations. The oscillation sources 6 and 7 (see FIG. 1B) are housed in casing G, and can each impart a radial oscillation component to the outlet section 2. This radial oscillation component leads to a normal component N on the inner surface 5 of the outlet 2a. The oscillation sources 8 and 9 are also housed on casing G, and can impart an axial oscillation component to the outlet section 2. This axial oscillation component forms a tangential component T of oscillation on the inner surface 5 of the outlet 2a. It is also possible for the outlet section 2 itself to be the oscillation source, in particular a piezoelectric element.

A velocity profile P is indicated in channel 1 to illustrate the flow behavior of the material M.

FIG. 1B provides a diagrammatic view of the basic structure of the partial area of the inventively relevant machine according to the invention in cross section along the X-X plane. Supplemental to FIG. 1A, four resilient means 4 uniformly distributed in the peripheral direction are visible here, and used to mount the outlet section 2 to the casing G.

Depending on the actuation of individual oscillation sources, the sum total of oscillation sources 6, 7, 8, 9 enables the introduction of freely adjustable oscillation patterns into the material M passing through the outlet 2a. For example, the interference patterns or standing waves described in the introduction can be generated in the material M with a vary high oscillation amplitude, making it possible to specifically influence the rheological properties of the material M. This type of influence, for example, takes the form of deagglomerating suspended or emulsified particles in a suspension or emulsion or influencing the structure of crystal nuclei in a melt.

FIG. 2 provides a diagrammatic view of a second inventively relevant exemplary embodiment of a partial area of the machine according to the invention. It involves an extruder 20 with a casing G, in which an extruding screw 22 is arranged upstream of a vibratable melt filter 21 in the channel 1 of the extruder 20. The extruding screw 22 has a screw thread 23 and a screw head 24. The vibratable melt filter 21 can be a polymer filter, and contains numerous passages 21a. The polymer filter 21 is flexibly mounted to the casing G by means of springs 4. Also provided are two oscillation sources 8, 9 that are mounded in the casing G, and contact the polymer filter 21. In this exemplary embodiment, the oscillation sources 8, 9 are configured in such a way as to impart an oscillation component tangential relative to the inner surface of the passages 21a to the polymer filter 21. This prevents the passages 21a of the polymer filter 21 from becoming clogged.

FIG. 3 provides a diagrammatic view of a third exemplary embodiment of an inventively relevant partial area of the machine according to the invention. Involved here is a part of a casting machine 30 in which an attempt is made to influence crystallization in order to impact the structure, size and number of crystal nuclei in the melt. The casting machine can be a machine for manufacturing chocolate coatings made out of melted chocolate, or a diecasting machine for manufacturing castings out of aluminum or aluminum/magnesium alloys, for example. A channel 1 with an outlet consisting of several partial areas 2a, 2b and 2c runs inside a casing G here as well. The upstream side of the outlet section 2 has a partial area 2b of the outlet that conically converges along the conveying direction F, while the downstream side of the outlet section 2 has a partial area 2c that conically diverges in the conveying direction F. The two cone tips of the converging partial area 2b and the diverging partial area 2c are connected to each other by a cylindrical partial area 2a. The respective velocity profile P1, P2 and P3 is denoted at several locations of the channel 1 to illustrate the laminar flow conditions. The arrows in channel 1 also illustrate the flow conditions. A total of three oscillation sources 6, 8 and 9 pare provided. The oscillation source 6 generates a mechanical-wave that primarily encompasses the cylindrical partial area 2a of the outlet. The oscillation sources 8 and 9 trigger a tangential oscillation component T of the outlet section 2. Both normal and tangential oscillation components therefore become overlapped on the inner surface of the cylindrical channel 2a. Individually setting the phase and amplitude of the respective oscillation source 6, 8 and 9 therefore makes it possible to generate numerous oscillation states (e.g., interference patterns, standing waves) in the material M moving through the cylindrical partial area 2a of the outlet section 2. In addition to the vibration treatment, this exemplary embodiment enables the generation of an expansion flow in the upstream, conically converging partial area 2b of the outlet section 2. This exemplary embodiment is therefore also suitable for deagglomerating suspended or emulsified particles in a suspension or emulsion. Therefore, it is particularly advantageous to use this exemplary embodiment for preparing heated chocolate before the process of casting it. Therefore, such a "conditioning cell" for heated chocolate enables any combination of expansion flow (partial areas 2b and 2c of the outlet section 2), shearing flow (partial area 2a of the outlet section 2) and vibration field (primarily partial area 2a of the outlet section). Primarily a deagglomeration of suspended or emulsified particles takes place in the expansion flow areas, while primarily the structure of the crystal nuclei is influenced in the shearing flow area.

Two pressure sensors 31 and 32 are also provided in the outlet section 2. The first sensor 31 is situated at the upstream end of the cylindrical partial area 2a, while the second pressure sensor is located at the downstream end of the cylindrical partial area 2a. The two pressure sensors 31 and 32 make it possible to detect a pressure difference between the upstream and downstream end of the cylindrical partial area 2a of the outlet section 2, from which the shear stress of the wall can be calculated. It therefore becomes possible to conduct a rheological inline measurement in the cylindrical partial area 2a. This measurement enables a continuous monitoring of shear viscosity. This is important, for example, for controlling the chocolate or aluminum crystallization process.

In addition to the mentioned cylinder-symmetrical geometry with respectively circular cross section in the channel 1 of the second exemplary embodiment, a geometry with rectangular cross section is also conceivable. It is particularly advantageous to have a geometry wherein one side of the rectangle is very large and the other side of the rectangle is very small. In this way, a slotted partial area 2a in which a very high shearing gradient can be generated is obtained in place of the cylindrical partial area 2a.

FIG. 4 provides a diagrammatic view of a fourth exemplary embodiment of an inventively relevant partial area of the machine according to the invention. The casing G here also envelops a channel 1, through which the material M is pumped along the conveying direction F. The inventively relevant partial area of the channel 1 has three lattices 43, 44, 45 that are fixed in place in the channel 1, spaced apart from each other along the conveying direction F. This gives rise to a first partial area 47 between the lattices 43 and 44, while a second partial area 48 is formed between the lattices 44 and 45. Rod-shaped collision elements 41 are arranged inside the first partial area 47, while spherical collision elements 42 are arranged in the second partial area 48. An oscillation source (not shown) vibrates the entire casing G, so that the collision elements (rods or balls) contained in the respective partial areas 47 and 48 are also made to move rapidly to and fro.

The shearing effect predominates in the first partial area 47 with the rod-shaped collision elements 41, while the impact effect predominates in the second partial area 48 with the spherical collision elements 42. Therefore, the size, shape and number of collision elements 41 and 42 in the respective partial areas make it possible to establish tailored treatment conditions for the respective material M to be machined/processed while transported through the two partial areas 47 and 48 in conjunction with the frequency of the excitation oscillation.

In this fourth exemplary embodiment, the outlet section is formed by the first partial area 47 (shearing area for reducing viscosity) and the second partial area 48 (impact area with dispersive and distributive effect) of the channel 1. Situated downstream from the lattice 45 in the channel 1 is a first device 10 for acquiring the rheological properties of the material after it has been subjected to shearing and impact treatment. Situated upstream from the lattice 43 is a second device 12 for acquiring the rheological properties of the material before it is subjected to shearing and impact treatment. The first acquisition device 10 is connected with a first signal output 11, while the second acquisition device 12 is connected with the second a second signal output 13. The signals generated at the outputs 11 and 13 characterize the physicochemical, in particular rheological properties of the material M downstream or upstream from the treatment of the material via shearing and/or expansion and impact. A comparison of the rheological properties acquired in this way after or before treating the material is used with the help of a control circuit (not shown) for actuating the at least one oscillation source (not shown).

Instead of exposing the casing G with the collision elements 41 and 42 contained therein to oscillation via the direct mechanical coupling of a source for mechanical oscillations (not shown) to the casing G, a non-contact, inductive coupling of a source for electromagnetic oscillations to the collision elements 41 and 42 can take place. One precondition for this, however, is that at least one part of the collision elements 41 or collision elements 42 be electrically conductive. The advantage to this elegant mode of vibrating the collision elements 41 or 42 is that the casing G itself need not be vibrated.

REFERENCE SYMBOL LIST

1 Channel
2 Outlet section 2a of outlet
2a, 2b, 2c Partial outlet areas
4 Resilient means/spring
5 Inner surface of outlet
6, 7, 8, 9 Source for oscillations
G Casing
T Tangential component of oscillations
N Normal component of oscillations
F Conveying direction of material
M Material
P, P1, P2, P3 Velocity profile of transported material
10 $1^{st}$ device for acquiring rheological properties of material
11 $1^{st}$ signal output
12 $2^{nd}$ device for acquiring rheological properties of material
13 $2^{nd}$ signal output
20 Extruder
21 Melt filter/polymer filter
21a Passage in melt filter
22 Extruder screw
23 Screw thread
24 Screw head
30 Casting machine (e.g., for chocolate or aluminum)
31, 32 Pressure sensor 41 Collision element (rod)
42 Collision element (ball)
43, 44, 45 Lattices
47 Partial region of the passage section
48 Partial region of the passage section

The invention claimed is:

1. A machine for machining or processing a conveyable material, comprising:
structure defining a channel, at least a partial area of said channel being defined by at least one outlet section including at least one outlet through which the conveyable material to be machined or processed is transportable along a conveying direction, said at least one outlet section being moveably mounted relative to a remainder of the structure defining the channel of the machine, the at least one outlet section being coupled with at least one source for oscillations operable to mechanically oscillate said at least one outlet section relative to the structure defining the channel of the machine, a volumetric section within said at least one outlet section in the channel of the machine through which the conveyable material is transported having vibratable collision elements captively received therein and which subject the conveyable material to at least one of a shearing or an impact treatment when said at least one outlet section is mechanically oscillated to cause the collision elements to collide with one another.

2. The machine according to claim 1, wherein the at least one outlet section is mounted relative to the structure defining the remainder of the channel of the machine using resilient devices.

3. The machine according to claim 1, further comprising damping devices which are arranged between the at least one outlet section and the channel of the machine, assisted at least in part by the conveyable material.

4. The machine according to claim 1, wherein the at least one outlet section and the structure defining the remainder of the channel of the machine are decoupled in terms of oscillation.

5. The machine according to claim 1, wherein said at least one source for oscillations can impart to the at least one outlet section, oscillations of a kind that exhibit a tangential and/or normal component relative to an inner surface of the at least one outlet facing the conveyable material.

6. The machine according to claim 1, wherein the at least one outlet section includes several outlet sections sequentially arranged in at least one partial area of the channel of the machine along the conveying direction of the channel.

7. The machine according to claim 6, wherein at least some of the several sequential outlet sections can be spaced apart along the conveying direction.

8. The machine according to claim 6, wherein the several outlet sections are identical to each other.

9. The machine according to claim 6, wherein at least some of the several outlet sections are different from each other.

10. The machine according to claim 6, wherein the several outlet sections can be made to oscillate identically to each other.

11. The machine according to claim 6, wherein at least some of the several outlet sections can be made to oscillate differently from each other.

12. The machine according to claim 1, wherein the at least one source for mechanical oscillations is a vibrator, and the mechanical oscillations are dampened, forced oscillations of the at least one outlet section.

13. The machine according to claim 1, wherein the at least one source for mechanical oscillations is a striker that generates dampened collision excitations of the at least one outlet section.

14. The machine according to claim 12, wherein the at least one source for mechanical oscillations includes several sources for mechanical oscillations.

15. The machine according to claim 12, wherein the at least one source for mechanical oscillations can be actuated independently of the operating status of the machine.

16. The machine according to claim 14, wherein the several sources for mechanical oscillations can be actuated separately from each other.

17. The machine according to claim 1, further comprising:
at least one first device for acquiring the rheological properties of the conveyable material being arranged downstream from a respective one of said at least one outlet section in order to generate first signals at a first signal output that characterize rheological properties of the material downstream from the respective one of said at least one outlet section.

18. The machine according to claim 17, further comprising at least one second device for acquiring the rheological properties of the conveyable material being arranged upstream from the respective one of said at least one outlet section in order to generate second signals at a second signal output that characterize the rheological properties of the material upstream from the respective one of said at least one outlet section.

19. The machine according to claim 18, wherein the signals of the first and/or second signal output are compared with those reference signals that characterize specific rheological properties, wherein feedback takes place within a control circuit as a function of the result from comparing the signals to activate the at least one source for mechanical oscillations.

20. The machine according to claim 19, wherein the signals of the first and second signal output are compared with each other, wherein feedback takes place within a control circuit as a function of the result from comparing the signals to activate the at least one source for mechanical oscillations.

21. The machine according to claim 1, wherein the channel of the machine and the at least one outlet of the at least one outlet section run vertically.

22. The machine according to claim 1, wherein the channel of the machine and the at least one outlet of the at least one outlet section run horizontally.

23. The machine according to claim 1, wherein the machine is an extruder, and the at least one outlet section is a die of the extruder.

24. The machine according to claim 1, wherein the machine is an extruder, and the at least one outlet section is a melt filter of the extruder.

25. The machine according to claim 1, wherein the machine is a diecasting machine, and the at least one outlet section is a conditioning cell of the diecasting machine.

26. The machine according to claim 1, wherein the collision elements form as dense a package as possible, with hollow spaces between contacting ones of the collision elements.

27. The machine according to claim 1, wherein the collision elements can vary in size and/or shape.

28. The machine according to claim 1, wherein the collision elements have at least one of the following shapes: spherical, polyhedral, bar-shaped, cylindrical or prismatic.

29. The machine according to claim 1, wherein at least one part of the collision elements consists of an electrically conductive material, and the source for oscillations is a source for electromagnetic oscillations, wherein the electrically conductive collision elements can be excited by the generated electromagnetic alternating fields to mechanical oscillations and/or movements.

30. A machine for treating a conveyable material of certain physiochemical properties when entering said machine, the machine comprising:
   housing structure defining a channel and having an inlet section for allowing introduction of said conveyable material, a channel section and an outlet section for discharging said conveyable material, said outlet section, at least in part, being transversely movably supported relative to said channel section;
   a plurality of collision elements able to collide with each other and arranged within said outlet section of said channel;
   a filtering arrangement being disposed in said outlet section for retaining said plurality of collision elements in said outlet section, but to allow passage of said conveyable material; and
   at least one source of oscillations coupled to said outlet section to impart oscillations to said collision elements in order to cause them to collide with each other.

31. The machine according to claim 30, wherein said filtering arrangement comprises a first filter which is disposed upstream of said plurality of collision elements and a second filter which is disposed downstream said plurality of collision elements.

32. A machine according to claim 30, wherein said collision elements comprise at least two groups of different elements separated from one another by said filtering arrangement.

33. A machine according to claim 30, wherein:
   said collision elements are electrically conductive, and
   said oscillation source includes an inductive source operable for transferring oscillating movement to said conductive collision elements.

34. A machine for treating a conveyable material passing therethrough, comprising:
   housing structure defining a channel extending through an inlet section for allowing introduction of said conveyable material, a channel section and an outlet section for discharging said conveyable material;
   a plurality of electrically conductive collision elements being captively received within said outlet section of said channel in a manner allowing passage of said conveyable material therepast from the inlet section for subsequent discharge from the outlet section; and
   at least one inductive source of oscillations coupled to said outlet section to impart oscillations to said collision elements in order to cause them to collide with each other without requiring direct oscillation of the housing structure.

* * * * *